United States Patent
Rose et al.

(10) Patent No.: US 7,644,136 B2
(45) Date of Patent: Jan. 5, 2010

(54) VIRTUAL FILE SYSTEM

(75) Inventors: Steven W. Rose, Haliimaile, HI (US);
Neil A. Rhoads, Kihei, HI (US);
Corinna G. Abdul, Wailuku, HI (US)

(73) Assignee: Interactive Content Engines, LLC., Honolulu, HI (US)

(*) Notice: Subject to any disclaimer, the term of this patent is extended or adjusted under 35 U.S.C. 154(b) by 1156 days.

(21) Appl. No.: 10/999,286

(22) Filed: Nov. 30, 2004

(65) Prior Publication Data
US 2005/0114350 A1 May 26, 2005

Related U.S. Application Data (63) Continuation-in-part of application No. 10/304,378, filed on Nov. 26, 2002, now Pat. No. 7,437,472.

(60) Provisional application No. 60/526,390, filed on Dec. 2, 2003, provisional application No. 60/333,856, filed on Nov. 28, 2001.

(51) Int. Cl.
*G06F 15/16* (2006.01)
(52) U.S. Cl. ............... 709/219; 709/217; 709/231
(58) Field of Classification Search ............... None
See application file for complete search history.

(56) References Cited

U.S. PATENT DOCUMENTS

| | | |
|---|---|---|
| 4,349,875 A | 9/1982 | Tada |
| 5,410,343 A | 4/1995 | Coddington et al. |
| 5,421,031 A | 5/1995 | De Bey |
| 5,473,362 A | 12/1995 | Fitzgerald et al. |
| 5,521,631 A | 5/1996 | Budow et al. |
| 5,528,282 A | 6/1996 | Voeten et al. |
| 5,550,577 A | 8/1996 | Verbiest et al. |

(Continued)

FOREIGN PATENT DOCUMENTS

CA 2444438 10/2002

(Continued)

OTHER PUBLICATIONS

International Search Report from the Patent Corporation Treaty 4 pages.

(Continued)

*Primary Examiner*—Hassan Phillips
(74) *Attorney, Agent, or Firm*—Gary R. Stanford (57) ABSTRACT

A virtual file system including multiple storage processor nodes including a management node, a backbone switch, a disk drive array, and a virtual file manager executing on the management node. The backbone switch enables communication between the storage processor nodes. The disk drive array is coupled to and distributed across the storage processor nodes and stores multiple titles. Each title is divided into data subchunks which are distributed across the disk drive array in which each subchunk is stored on a disk drive of the disk drive array. The virtual file manager manages storage and access of each subchunk, and manages multiple directory entries including a directory entry for each title. Each directory entry is a list of subchunk location entries in which each subchunk location entry includes a storage processor node identifier, a disk drive identifier, and a logical address for locating and accessing each subchunk of each title.

25 Claims, 6 Drawing Sheets

U.S. PATENT DOCUMENTS

| | | | |
|---|---|---|---|
| 5,581,735 A | | 12/1996 | Kajitani et al. |
| 5,604,682 A | * | 2/1997 | McLaughlin et al. ........ 709/219 |
| 5,606,359 A | | 2/1997 | Youden et al. |
| 5,608,448 A | | 3/1997 | Smoral et al. |
| 5,625,405 A | * | 4/1997 | DuLac et al. ................. 725/93 |
| 5,671,377 A | | 9/1997 | Bleidt et al. |
| 5,678,061 A | | 10/1997 | Mourad |
| 5,712,976 A | | 1/1998 | Falcon, Jr. et al. |
| 5,721,815 A | | 2/1998 | Ottesen et al. |
| 5,732,239 A | | 3/1998 | Tobagi et al. |
| 5,790,794 A | | 8/1998 | Dulac et al. |
| 5,805,804 A | | 9/1998 | Laursen et al. |
| 5,815,146 A | | 9/1998 | Youden et al. |
| 5,818,512 A | | 10/1998 | Fuller |
| 5,862,312 A | | 1/1999 | Mann et al. |
| 5,862,403 A | | 1/1999 | Kanai et al. |
| 5,892,915 A | * | 4/1999 | Duso et al. ................... 709/219 |
| 5,996,089 A | | 11/1999 | Mann et al. |
| 6,005,599 A | | 12/1999 | Asai et al. |
| 6,032,200 A | | 2/2000 | Lin |
| 6,049,823 A | | 4/2000 | Hwang |
| 6,070,186 A | * | 5/2000 | Nishio ........................... 725/92 |
| 6,101,547 A | | 8/2000 | Mukherjee et al. |
| 6,128,467 A | * | 10/2000 | Rege ............................ 725/116 |
| 6,134,596 A | | 10/2000 | Bolosky et al. |
| 6,182,128 B1 | * | 1/2001 | Kelkar et al. .................. 725/87 |
| 6,230,200 B1 | | 5/2001 | Forecast et al. |
| 6,266,817 B1 | | 7/2001 | Chaddha |
| 6,275,898 B1 | | 8/2001 | DeKoning |
| 6,279,040 B1 | | 8/2001 | Ma et al. |
| 6,289,383 B1 | | 9/2001 | Rhine |
| 6,332,140 B1 | | 12/2001 | Rhine |
| 6,370,579 B1 | | 4/2002 | Partridge |
| 6,374,336 B1 | | 4/2002 | Peters et al. |
| 6,401,126 B1 | | 6/2002 | Doucer et al. |
| 6,415,373 B1 | | 7/2002 | Peters et al. |
| 6,449,688 B1 | * | 9/2002 | Peters et al. ................. 711/112 |
| 6,571,351 B1 | | 5/2003 | Mitaru et al. |
| 6,604,155 B1 | * | 8/2003 | Chong, Jr. ..................... 710/56 |
| 6,898,285 B1 | | 5/2005 | Hutchings et al. |
| 2002/0073172 A1 | * | 6/2002 | Armstrong et al. .......... 709/219 |
| 2002/0138696 A1 | * | 9/2002 | Kodama et al. ............. 711/114 |
| 2002/0157113 A1 | * | 10/2002 | Allegrezza .................. 725/115 |
| 2003/0046704 A1 | | 3/2003 | Laksono et al. |
| 2003/0088689 A1 | * | 5/2003 | Alexander et al. .......... 709/232 |

FOREIGN PATENT DOCUMENTS

| | | |
|---|---|---|
| JP | 8328760 | 12/1996 |
| JP | 200151890 | 2/2001 |

OTHER PUBLICATIONS

Hartman, J.H. et al. "The Zebra Striped Network File System." Operating System Review, ACM New York, NY, US. vol. 27, No. 5, Dec. 1, 1993. pp. 29-43. XP000418681, ISSN: 0163-5980.

Van Tassel, Joan et al. NTQ New Telecom Quarterly, The Evolution of the Interactive Broadband Server, Parts 1 and 2, 1996, 28 pages.

Rose, Steve; Video on Demand Playback Machine Investigation for ATC by Steve Rose, Viaduct Corp.; 1994; 18 pages.

Rose, Steve; Video on Demand Overview; 1994; 3 pages.

Rose, Steve ; Video on Demand: Current Status; 1994; 4 pages.

Santo, Brian; ATM may find use in video on demand; Electronic Engineering Times; 1994; p. 37; Maui, Hawaii.

Rose, Steve; Video on Demand and ATM—A Quick Overview; 1994; 2 pages.

CRC Electronics, Inc. / Model P-1000 / Videocassette Programmer (Pamphlet), CRC Electronics, Inc. / Model TD-100 / Time Delay Videotape Controller (Pamphlet), Capacity Plus (Pamphlet); 1994; 11 pages.

PCT Notification of Transmittal of the International Search Report or the Declaration. Dated Apr. 10, 2003. 3 pages.

* cited by examiner

Table 1: Storage Detail for Title 1  (GP = group, C = chunk, SC = subchunk)

|  |  | Drive 1 | Drive 2 | Drive 3 | Drive 4 |
|---|---|---|---|---|---|
| GP 1 | SPN 1 | C1, SC 1 | C4, SC 1 | C7, SC 1 | C10, SC 1 |
| GP 1 | SPN 2 | C1, SC 2 | C4, SC 2 | C7, SC 2 | C10, SC 2 |
| GP 1 | SPN 3 | C1, SC 3 | C4, SC 3 | C7, SC 3 | C10, SC 3 |
| GP 1 | SPN 4 | C1, SC 4 | C4, SC 4 | C7, SC 4 | C10, SC 4 |
| GP 1 | SPN 5 | C1, SC P | C4, SC P | C7, SC P | C10, SC P |
| GP 2 | SPN 1 | C2, SC 1 | C5, SC 1 | C8, SC 1 | C11, SC 1 |
| GP 2 | SPN 2 | C2, SC 2 | C5, SC 2 | C8, SC 2 | C11, SC 2 |
| GP 2 | SPN 3 | C2, SC 3 | C5, SC 3 | C8, SC 3 | C11, SC 3 |
| GP 2 | SPN 4 | C2, SC 4 | C5, SC 4 | C8, SC 4 | C11, SC 4 |
| GP 2 | SPN 5 | C2, SC P | C5, SC P | C8, SC P | C11, SC P |
| GP 3 | SPN 1 | C3, SC 1 | C6, SC 1 | C9, SC 1 | C12, SC 1 |
| GP 3 | SPN 2 | C3, SC 2 | C6, SC 2 | C9, SC 2 | C12, SC 2 |
| GP 3 | SPN 3 | C3, SC 3 | C6, SC 3 | C9, SC 3 | C12, SC 3 |
| GP 3 | SPN 4 | C3, SC 4 | C6, SC 4 | C9, SC 4 | C12, SC 4 |
| GP 3 | SPN 5 | C3, SC P | C6, SC P | C9, SC P | C12, SC P |

*FIG. 4*

Table 2: Storing Titles  (T = content title, C = chunk)

|  | RAID Group 1 | RAID Group 2 | RAID Group 3 | RAID Group 4 |
|---|---|---|---|---|
| SPN Group 1 | T1 C1<br>T1 C13<br>T2 C9<br>T3 C5<br>T4 C4 | T1 C4<br>T1 C16<br>T3 C8<br>T4 C7 | T1 C7<br>T1 C19<br>T2 C3<br>T4 C10 | T1 C10<br>T1 C22<br>T2 C6<br>T3 C2<br>T4 C1 |
| SPN Group 2 | T1 C2<br>T1 C14<br>T2 C10<br>T3 C6<br>T4 C5 | T1 C5<br>T1 C17<br>T2 C1<br>T3 C9<br>T4 C8 | T1 C8<br>T1 C20<br>T2 C4<br>T4 C11 | T1 C11<br>T1 C23<br>T2 C7<br>T3 C3<br>T4 C2 |
| SPN Group 3 | T1 C3<br>T1 C15<br>T3 C7<br>T4 C6 | T1 C6<br>T1 C18<br>T2 C2<br>T4 C9 | T1 C9<br>T1 C21<br>T2 C5<br>T3 C1<br>T4 C12 | T1 C12<br>T1 C24<br>T2 C8<br>T3 C4<br>T4 C3 |

*FIG. 5*

Table 3: Chunk Locators for the Titles in Table 2

| Chunk | Title 1 | | | Title 2 | | | Title 3 | | | Title 4 | | |
|---|---|---|---|---|---|---|---|---|---|---|---|---|
| | Group | Disk | Block | Group | Disk | Block | Group | Disk | Block | Group | Disk | Block |
| 1 | 1 | 1 | 0 | 2 | 2 | 2 | 3 | 3 | 3 | 1 | 4 | 4 |
| 2 | 2 | 1 | 0 | 3 | 2 | 2 | 1 | 4 | 3 | 2 | 4 | 4 |
| 3 | 3 | 1 | 0 | 1 | 3 | 2 | 2 | 4 | 3 | 3 | 4 | 4 |
| 4 | 1 | 2 | 0 | 2 | 3 | 2 | 3 | 4 | 3 | 1 | 1 | 4 |
| 5 | 2 | 2 | 0 | 3 | 3 | 2 | 1 | 1 | 3 | 2 | 1 | 4 |
| 6 | 3 | 2 | 0 | 1 | 4 | 2 | 2 | 1 | 3 | 3 | 1 | 3 |
| 7 | 1 | 3 | 0 | 2 | 4 | 2 | 3 | 1 | 2 | 1 | 2 | 3 |
| 8 | 2 | 3 | 0 | 3 | 4 | 2 | 1 | 2 | 2 | 2 | 2 | 3 |
| 9 | 3 | 3 | 0 | 1 | 1 | 2 | 1 | 2 | 3 | 3 | 2 | 3 |
| 10 | 1 | 4 | 0 | 2 | 1 | 2 | | | | 1 | 3 | 3 |
| 11 | 2 | 4 | 0 | | | | | | | 2 | 3 | 3 |
| 12 | 3 | 4 | 0 | | | | | | | 3 | 3 | 4 |

*FIG. 6*

Table 4: Content Striping Example  (T1-C15-Sa = Title 1, Chunk 15, Subchunk a)

| RAID Group | SPN | Disk | Block 0 | Block 1 | Block 2 | Block 3 | Block 4 |
|---|---|---|---|---|---|---|---|
| 1 | 1 | 1 | T1-C01-Sa | T1-C13-Sa | T2-C09-Sa | T3-C05-Sa | T4-C04-Sa |
| | | 2 | T1-C04-Sa | T1-C16-Sa | T3-C08-Sa | T4-C07-Sa | |
| | | 3 | T1-C07-Sa | T1-C19-Sa | T2-C03-Sa | T4-C10-Sa | |
| | | 4 | T1-C10-Sa | T1-C22-Sa | T2-C06-Sa | T3-C02-Sa | T4-C01-Sa |
| | 2 | 1 | T1-C01-Sb | T1-C13-Sb | T2-C09-Sb | T3-C05-Sb | T4-C04-Sb |
| | | 2 | T1-C04-Sb | T1-C16-Sb | T3-C08-Sb | T4-C07-Sb | |
| | | 3 | T1-C07-Sb | T1-C19-Sb | T2-C03-Sb | T4-C10-Sb | |
| | | 4 | T1-C10-Sb | T1-C22-Sb | T2-C06-Sb | T3-C02-Sb | T4-C01-Sb |
| | 3 | 1 | T1-C01-Sc | T1-C13-Sc | T2-C09-Sc | T3-C05-Sc | T4-C04-Sc |
| | | 2 | T1-C04-Sc | T1-C16-Sc | T3-C08-Sc | T4-C07-Sc | |
| | | 3 | T1-C07-Sc | T1-C19-Sc | T2-C03-Sc | T4-C10-Sc | |
| | | 4 | T1-C10-Sc | T1-C22-Sc | T2-C06-Sc | T3-C02-Sc | T4-C01-Sc |
| | 4 | 1 | T1-C01-Sd | T1-C13-Sd | T2-C09-Sd | T3-C05-Sd | T4-C04-Sd |
| | | 2 | T1-C04-Sd | T1-C16-Sd | T3-C08-Sd | T4-C07-Sd | |
| | | 3 | T1-C07-Sd | T1-C19-Sd | T2-C03-Sd | T4-C10-Sd | |
| | | 4 | T1-C10-Sd | T1-C22-Sd | T2-C06-Sd | T3-C02-Sd | T4-C01-Sd |
| | 5 | 1 | T1-C01-Sp | T1-C13-Sp | T2-C09-Sp | T3-C05-Sp | T4-C04-Sp |
| | | 2 | T1-C04-Sp | T1-C16-Sp | T3-C08-Sp | T4-C07-Sp | |
| | | 3 | T1-C07-Sp | T1-C19-Sp | T2-C03-Sp | T4-C10-Sp | |
| | | 4 | T1-C10-Sp | T1-C22-Sp | T2-C06-Sp | T3-C02-Sp | T4-C01-Sp |
| 2 | 1 | 1 | T1-C02-Sa | T1-C14-Sa | T2-C10-Sa | T3-C06-Sa | T4-C05-Sa |
| | | 2 | T1-C05-Sa | T1-C17-Sa | T2-C01-Sa | T3-C09-Sa | T4-C08-Sa |
| | | 3 | T1-C08-Sa | T1-C20-Sa | T2-C04-Sa | T4-C11-Sa | |
| | | 4 | T1-C11-Sa | T1-C23-Sa | T2-C07-Sa | T3-C03-Sa | T4-C02-Sa |
| | 2 | 1 | T1-C02-Sb | T1-C14-Sb | T2-C10-Sb | T3-C06-Sb | T4-C05-Sb |
| | | 2 | T1-C05-Sb | T1-C17-Sb | T2-C01-Sb | T3-C09-Sb | T4-C08-Sb |
| | | 3 | T1-C08-Sb | T1-C20-Sb | T2-C04-Sb | T4-C11-Sb | |
| | | 4 | T1-C11-Sb | T1-C23-Sb | T2-C07-Sb | T3-C03-Sb | T4-C02-Sb |
| | 3 | 1 | T1-C02-Sc | T1-C14-Sc | T2-C10-Sc | T3-C06-Sc | T4-C05-Sc |
| | | 2 | T1-C05-Sc | T1-C17-Sc | T2-C01-Sc | T3-C09-Sc | T4-C08-Sc |
| | | 3 | T1-C08-Sc | T1-C20-Sc | T2-C04-Sc | T4-C11-Sc | |
| | | 4 | T1-C11-Sc | T1-C23-Sc | T2-C07-Sc | T3-C03-Sc | T4-C02-Sc |
| | 4 | 1 | T1-C02-Sd | T1-C14-Sd | T2-C10-Sd | T3-C06-Sd | T4-C05-Sd |
| | | 2 | T1-C05-Sd | T1-C17-Sd | T2-C01-Sd | T3-C09-Sd | T4-C08-Sd |
| | | 3 | T1-C08-Sd | T1-C20-Sd | T2-C04-Sd | T4-C11-Sd | |
| | | 4 | T1-C11-Sd | T1-C23-Sd | T2-C07-Sd | T3-C03-Sd | T4-C02-Sd |
| | 5 | 1 | T1-C02-Sp | T1-C14-Sp | T2-C10-Sp | T3-C06-Sp | T4-C05-Sp |
| | | 2 | T1-C05-Sp | T1-C17-Sp | T2-C01-Sp | T3-C09-Sp | T4-C08-Sp |
| | | 3 | T1-C08-Sp | T1-C20-Sp | T2-C04-Sp | T4-C11-Sp | |
| | | 4 | T1-C11-Sp | T1-C23-Sp | T2-C07-Sp | T3-C03-Sp | T4-C02-Sp |
| 3 | 1 | 1 | T1-C03-Sa | T1-C15-Sa | T3-C07-Sa | T4-C06-Sa | |
| | | 2 | T1-C06-Sa | T1-C18-Sa | T2-C02-Sa | T4-C09-Sa | |
| | | 3 | T1-C09-Sa | T1-C21-Sa | T2-C05-Sa | T3-C01-Sa | T4-C12-Sa |
| | | 4 | T1-C12-Sa | T1-C24-Sa | T2-C08-Sa | T3-C04-Sa | T4-C03-Sa |
| | 2 | 1 | T1-C03-Sb | T1-C15-Sb | T3-C07-Sb | T4-C06-Sb | |
| | | 2 | T1-C06-Sb | T1-C18-Sb | T2-C02-Sb | T4-C09-Sb | |
| | | 3 | T1-C09-Sb | T1-C21-Sb | T2-C05-Sb | T3-C01-Sb | T4-C12-Sb |
| | | 4 | T1-C12-Sb | T1-C24-Sb | T2-C08-Sb | T3-C04-Sb | T4-C03-Sb |
| | 3 | 1 | T1-C03-Sc | T1-C15-Sc | T3-C07-Sc | T4-C06-Sc | |
| | | 2 | T1-C06-Sc | T1-C18-Sc | T2-C02-Sc | T4-C09-Sc | |
| | | 3 | T1-C09-Sc | T1-C21-Sc | T2-C05-Sc | T3-C01-Sc | T4-C12-Sc |
| | | 4 | T1-C12-Sc | T1-C24-Sc | T2-C08-Sc | T3-C04-Sc | T4-C03-Sc |
| | 4 | 1 | T1-C03-Sd | T1-C15-Sd | T3-C07-Sd | T4-C06-Sd | |
| | | 2 | T1-C06-Sd | T1-C18-Sd | T2-C02-Sd | T4-C09-Sd | |
| | | 3 | T1-C09-Sd | T1-C21-Sd | T2-C05-Sd | T3-C01-Sd | T4-C12-Sd |
| | | 4 | T1-C12-Sd | T1-C24-Sd | T2-C08-Sd | T3-C04-Sd | T4-C03-Sd |
| | 5 | 1 | T1-C03-Sp | T1-C15-Sp | T3-C07-Sp | T4-C06-Sp | |
| | | 2 | T1-C06-Sp | T1-C18-Sp | T2-C02-Sp | T4-C09-Sp | |
| | | 3 | T1-C09-Sp | T1-C21-Sp | T2-C05-Sp | T3-C01-Sp | T4-C12-Sp |
| | | 4 | T1-C12-Sp | T1-C24-Sp | T2-C08-Sp | T3-C04-Sp | T4-C03-Sp |

*FIG. 7*

VIRTUAL FILE SYSTEM

CROSS-REFERENCE TO RELATED APPLICATIONS

This application claims the benefit of U.S. Provisional Application No. 60/526,390 filed on Dec. 2, 2003, and is a continuation-in-part of U.S. patent application entitled "Interactive Broadband Server System" Ser. No. 10/304,378 filed Nov. 26, 2002, now U.S. Pat. No. 7,437,472, which itself claims the benefit of U.S. Provisional Application No. 60/333,856 filed on Nov. 28, 2001, all of which having a common inventor, being commonly assigned, and being herein incorporated by reference for all intents and purposes.

BACKGROUND OF THE INVENTION

1. Field of the Invention

The present invention relates to interactive broadband server systems, and more particularly, to virtual file system that manages and maintains information of data distributed across an array of storage devices.

2. Description of the Related Art

It is desired to provide a solution for the storage and delivery of streaming media content. An initial goal for scalability is from 100 to 1,000,000 simultaneous individual isochronous content streams at 4 megabits per second (Mbps) per stream, although different data rates are contemplated. The total bandwidth available is limited by the largest available backplane switch. The largest switches at the present time are in the terabit per second range, or about 200,000 simultaneous output streams. The number of output streams is generally inversely proportional to the bit rate per stream.

The simplest model of content storage is a single disk drive connected to a single processor which has a single network connector. Data is read from the disk, placed in memory, and distributed in packets, via a network, to each user. Traditional data, such as Web pages or the like, can be delivered asynchronously. In other words, there are random amounts of data with random time delays. Low volume, low resolution video can be delivered from a Web server. Real time media content, such as video and audio, require isochronous transmission, or transmission with guaranteed delivery times. In this scenario, a bandwidth constraint exists at the disk drive. The disk has arm motion and rotational latency to contend with. If the system can only sustain 6 simultaneous streams of continuous content from the drive to the processor at any given time, then the 7th user's request must wait for one of the prior 6 users to give up a content stream. The upside of this design is simplicity. The downside is the disk, which, as the sole mechanical device in the design, can only access and transfer data so fast.

An improvement can be made by adding another drive, or drives, and interleaving the drive accesses. Also, duplicate content can be stored on each drive to gain redundancy and performance. This is better, but there are still several problems. Only so much content can be placed on the local drive or drives. The disk drives, CPU, and memory are each single points of failure that could be catastrophic. This system can only be scaled to the number of drives the disk controller can handle. Even with many units, there is a problem with the distribution of titles. In the real world, everyone wants to see the latest movies. As a rule of thumb 80% of content requests are for just 20% of the titles. All of a machine's bandwidth cannot be consumed by one title, as it would block access to less popular titles stored only on that machine. As a result, the "high demand" titles would have to be loaded on most or all of the machines. In short, if a user wanted to see an old movie, that user might be out of luck—even though it is loaded in the system. With a large library, the ratio may be much greater than the 80/20 rule used in this example.

If the system were based on the standard Local Area Network (LAN) used in data processing, there would be other inefficiencies. Modern Ethernet-based TCP/IP systems are a marvel of guaranteed delivery, but include a time price caused by packet collisions and re-transmits of partially lost packets and the management needed to make it all work. There is no guarantee that a timely set of content streams will be available. Also, each user consumes a switch port and each content server consumes a switch port. Thus, the switch port count has to be twice the server count, limiting the total online bandwidth.

BRIEF DESCRIPTION OF THE DRAWINGS

The benefits, features, and advantages of the present invention will become better understood with regard to the following description, and accompanying drawings where:

FIG. 7 shows a Table 4 illustrating further details of how subchunks are stored on different groups, SPNs, and disk drives for the ICE of FIG. 1.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The architecture described herein accommodates individual components of varying capability to avoid an installation being limited to the point in time when the initial system purchase was made. The use of commodity components guarantees recent well proven technology, avoidance of sole sources, and the lowest cost per stream. Individual component failures are tolerated. In many cases, there is no noticeable change in behavior from a user's perspective. In other cases, there is a brief "self repair" cycle. In many cases, multiple failures may be tolerated. Also, in most if not all cases, the system can recover without requiring immediate attention, making it ideal for "lights out" operation.

Content storage allocation and internal bandwidth is automatically managed by Least Recently Used (LRU) algorithms which guarantee that the content in RAM cache and the hard drive array cache are appropriate to the current demand, and the backplane switch bandwidth is used in the most efficient manner. Bandwidth within the system is rarely, if ever, oversubscribed, so it is not necessary to discard or delay the transmission of packets. The architecture provides the ability to take full advantage of the composite bandwidth of each component, so guarantees can be met, and the network is private and under full control so even in a situation of unanticipated peak demand no data path is overloaded. Streams of any bit rate can be accommodated, but typical streams are expected to remain in the 1 to 20 Mbps range. Asynchronous content is accommodated on an available bandwidth basis. Bandwidth may be reserved for the purpose if required by the application. Files may be of any size with a minimum of storage inefficiency.

Figure 1:
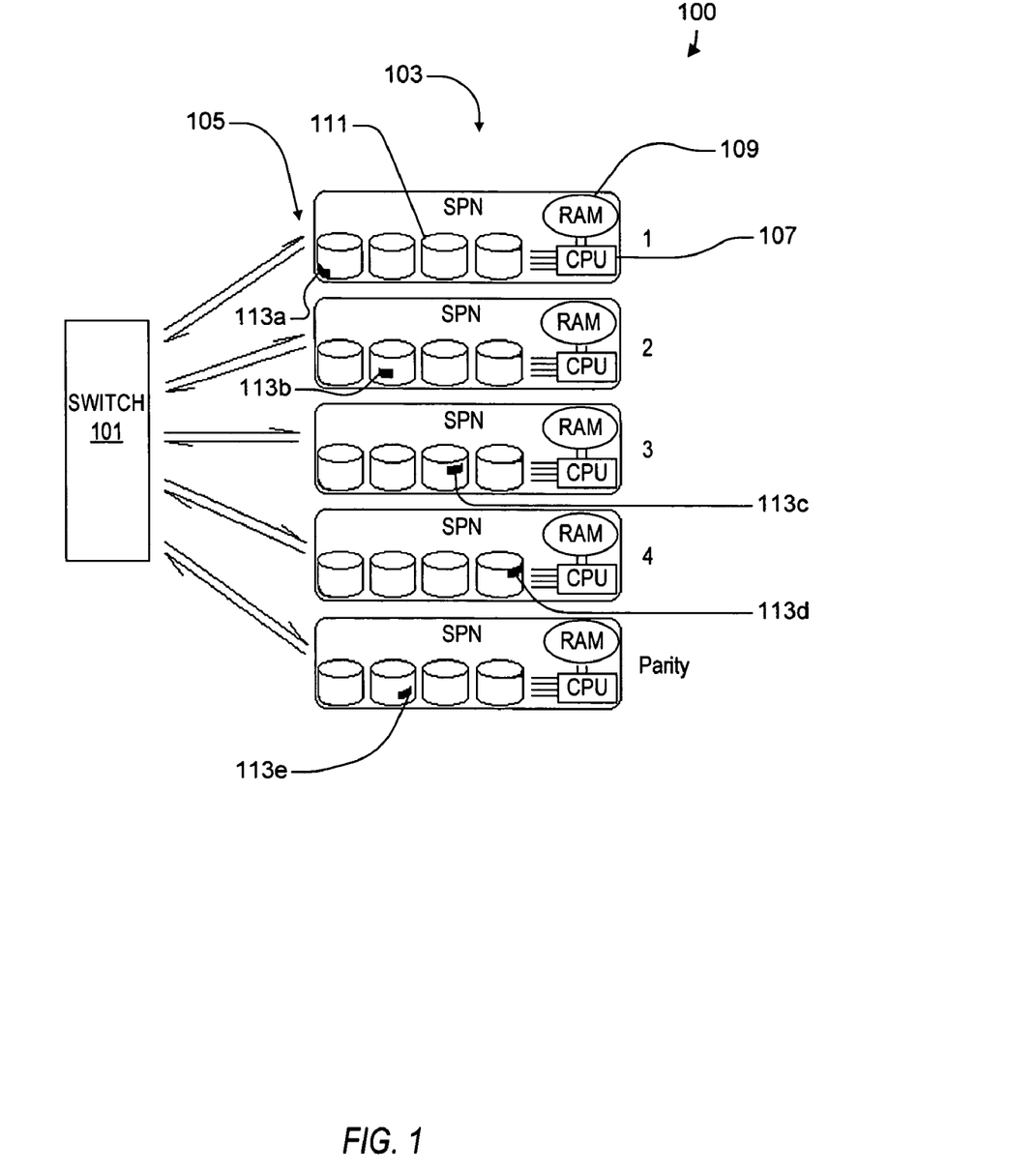
FIG. 1 is a simplified block diagram of a portion of an Interactive Content Engine (ICE) implemented according to an exemplary embodiment of the present invention.

FIG. 1 is a simplified block diagram of a portion of an Interactive Content Engine (ICE) 100 implemented according to an exemplary embodiment of the present invention. Portions not applicable for a full and complete understanding of the present invention are not shown for purposes of clarity. The ICE 100 includes an appropriate multiple-port (or multiport) Gigabit Ethernet (GbE) switch 101 as the backplane fabric having multiple Ethernet ports coupled to a number of Storage Processor Nodes (SPNs) 103. Each SPN 103 is a simplified server including two Gigabit Ethernet ports, one or more processors 107, memory 109 (e.g., random access memory (RAM)), and an appropriate number (e.g., four to eight) disk drives 111. A first Gb port 105 on each SPN 103 connects to a corresponding port of the switch 101 for full duplex operation (simultaneous transmission and reception at each SPN/port connection), and is used for moving data within the ICE 100. The other Gb port (not shown) delivers the content output to downstream users (not shown).

Each SPN 103 has high speed access to its local disk drives and to the other disk drives of the other four SPNs in each group of five SPNs. The switch 101 is a backplane for the ICE 100 instead of just a communication device between SPNs 103. Only five SPNs 103 are shown for purposes of illustration, where it is understood that the ICE 100 typically includes a larger number of servers. Each SPN 103 acts as storage, processing, and transmitter of content. In the configuration shown, each SPN 103 is configured using off-the-shelf components, and is not a computer in the usual sense. Although standard operating systems are contemplated, such interrupt driven operating systems may pose unnecessary bottlenecks.

Each title (e.g., video, movie or other media content) is not wholly stored on any single disk drive 111. Instead, the data for each title is divided and stored among several disk drives within the ICE 100 to achieve the speed benefits of interleaved access. The content of a single title is spread across multiple disk drives of multiple SPNs 103. Short "time frames" of title content are gathered in a round robin fashion from each drive in each SPN 103. In this manner, the physical load is spread escaping the drive count limits of SCSI and IDE, a form of fail-safe operation is gained, and a large set of titles are organized and managed.

In the particular configuration shown, each content title is divided into discrete chunks of a fixed size (typically about 2 megabytes (MB) per chunk). Each chunk is stored on a different set of SPNs 103 in a round robin fashion. Each chunk is divided into four subchunks, and fifth subchunk representing the parity is created. Each subchunk is stored on a disk drive of a different SPN 103. In the configuration shown and described, the subchunk size of about 512 kilobytes (KB) (where "K" is 1024) matches the nominal unit of data of each of the disk drives 111. The SPNs 103 are grouped five at a time, and each group or SPN set stores a chunk of data of a title. As shown, the five SPNs 103 are labeled 1-4 and "Parity", which collectively store a chunk 113 as five separate subchunks 113a, 113b, 113c, 113d and 113e stored on the SPNs 1, 2, 3, 4 and Parity, respectively. The subchunks 113a-113e are shown stored in a distributed manner on a different drive for each different SPN (e.g., SPN1/DRIVE1, SPN2/DRIVE2, SPN3/DRIVE3, etc.), but may be stored in any other possible combination (e.g., SPN1/DRIVE1, SPN2/DRIVE1, SPN3/DRIVE3, etc.) The subchunks 1-4 comprise the data and the subchunk Parity comprises the parity information for the data subchunks. The size of each SPN set, while typically five, is arbitrary and could just as easily be any other suitable number, such as, for example, 2 SPNs to 10 SPNs. Two SPNs would use 50% of their storage for redundancy, ten would use 10%. Five is a compromise between efficiency of storage and probability of failure.

By distributing content in this fashion, at least two goals are achieved. First, the number of users that can view a single title is not limited to the number which can be served by a single set of SPNs, but by the bandwidth of all the sets of SPNs taken together. Therefore, only one copy of each content title is required. The tradeoff is the limitation in the number of new viewers for a given title that can be launched each second, which is far less of a constraint than the wasted space and management overhead of redundant storage. A second goal is the increase in overall reliability of the ICE 100. The failure of a single drive is masked by the real time regeneration of its content using the parity drive, similar to a redundant array of independent disks (RAID). The failure of an SPN 103 is masked by the fact that it contains one drive from each of several RAID sets, each of which continues to operate. The users connected to a failed SPN are very quickly taken over by shadow processes running on other SPNs. In the event of failure of a disk drive or of an entire SPN, the operator is notified to repair or replace the failed equipment. When a missing subchunk is rebuilt by the user process, it is transmitted back to the SPN that would have provided it, where it is cached in RAM (as it would have been had it been read from the local disk). This avoids wasting the time of other user processes in doing the same rebuild for a popular title, as subsequent requests will be filled from RAM as long as that subchunk is popular enough to remain cached.

The goal of a user process (UP) running on each "user" SPN 103 is to gather the subchunks from its own disk plus the corresponding four subchunks from other user SPNs to assemble a chunk of video content for delivery. User SPNs are distinguished from one or more management MGMT SPNs, which are configured in the same manner but perform different functions, as further described below. A pair of redundant MGMT SPNs is contemplated to enhance reliability and performance. The gathering and assembling functions performed by each UP is done many times on behalf of many users on each user SPN 103. As a consequence, there is a significant amount of data traffic going between the user SPNs 103. The typical Ethernet protocol, with packet collision detection and retries, would otherwise be overwhelmed. Typical protocols are designed for random transmissions, and depend on slack time between those events. So this approach is not used. In the ICE 100, collisions are avoided by using a full duplex, fully switched architecture, and by managing bandwidth carefully. Most communication is done synchronously. The switch 101 itself is managed in a synchronous manner, as further described below, so that the transmissions are coordinated. Since it is determined which SPN 103 gets to transmit and when, ports are not overwhelmed with more data than they can handle during a given period. Indeed, data is first gathered in the memory 109 of user SPNs 103 and then its transfer is managed synchronously. As part of the orchestration, there are status signals between the user SPNs 103. Unlike the actual content going to the end user, the data size for signaling between the user SPN units is quite small.

The length of each subchunk (about 512K bytes, where "K" is 1024) would otherwise overwhelm any buffering available in the GbE switch 101 if the transmission of subchunks were allowed to be done randomly or asynchronously. The period for transmitting this much information is about 4 milliseconds (ms), and it is desired to make sure that several ports do not try and transmit to a single port simultaneously. Therefore, as further described below, the switch 101 is managed in a manner that causes it to operate synchronously, with all ports fully utilized under full load conditions.

The redundant directory process which manages the file system (or, virtual file system or VFS) is responsible for reporting where a given content title is stored when it is requested by a user. It is also responsible for allocating the required storage space when a new title is to be loaded. All allocations are in integral chunks, each of which is composed of five subchunks. Space on each disk drive is managed within the drive by Logical Block Address (LBA). A subchunk is stored on a disk drive in contiguous sectors or LBA addresses. The capacity of each disk drive in the ICE 100 is represented by its maximum LBA address divided by the number of sectors per subchunk.

Each title map or "directory entry" contains a list indicating where the chunks of its title are stored, and more specifically, where each subchunk of each chunk is located. In the illustrated embodiment, each item in the list representing a subchunk contains an SPNID identifying a specific user SPN 103, a disk drive number (DD#) identifying a specific disk drive 111 of the identified user SPN 103, and a subchunk pointer (or Logical Block Address or LBA) packed as a 64-bit value. Each directory entry contains a subchunk list for about half an hour of content at the nominal 4 Mbsp. This is equal to 450 chunks, or 2250 subchunks. Each directory entry is about 20 KB with ancillary data. When a UP executing on an SPN requests a directory entry, the entire entry is sent and stored locally for the corresponding user. Even if an SPN supports 1,000 users, only 20 MB of memory is consumed for the local lists or directory entries.

The ICE 100 maintains a database of all titles available to a user. This list includes the local optical disk library, real time network programming, and titles at remote locations where license and transport arrangements have been made. The database contains all the metadata for each title, including management information (licensing period, bit rate, resolution, etc.) as well as information of interest to the user (producer, director, cast, crew, author, etc.). When the user makes a selection, a directory of a virtual file system (VFS) 209 (FIG. 2) is queried to determine if the title is already loaded in the disk array. If not, a loading process (not shown) is initiated for that piece of content, and the UP is notified if necessary as to when it will be available for viewing. In most cases, the latency is no more than the mechanical latency of the optical disk retrieval robot (not shown), or about 30 seconds.

Information stored on the optical disk (not shown) includes all metadata (which is read into the database when the disk is first loaded into the library), as well as the compressed digital video and audio representing the title and all information that can be gleaned in advance about those data streams. For example, it contains pointers to all relevant information in the data streams such as clock values and time stamps. It is already divided into subchunks, with the parity subchunk pre-calculated and stored on the disk. In general, anything which can be done in advance to save loading time and processing overhead is included on the optical disk.

Included in the resource management system is a dispatcher (not shown) which a UP consults to receive a start time for its stream (usually within milliseconds of the request). The dispatcher insures that the load on the system remains even, that latency is minimized, and that at no time does the bandwidth required within the ICE 100 exceed that which is available. When ever a user requests a stop, pause, fast forward, rewind, or other operation which interrupts the flow of their stream, its bandwidth is de-allocated and a new allocation made for any new service requested (e.g., a fast forward stream).

Figure 2:
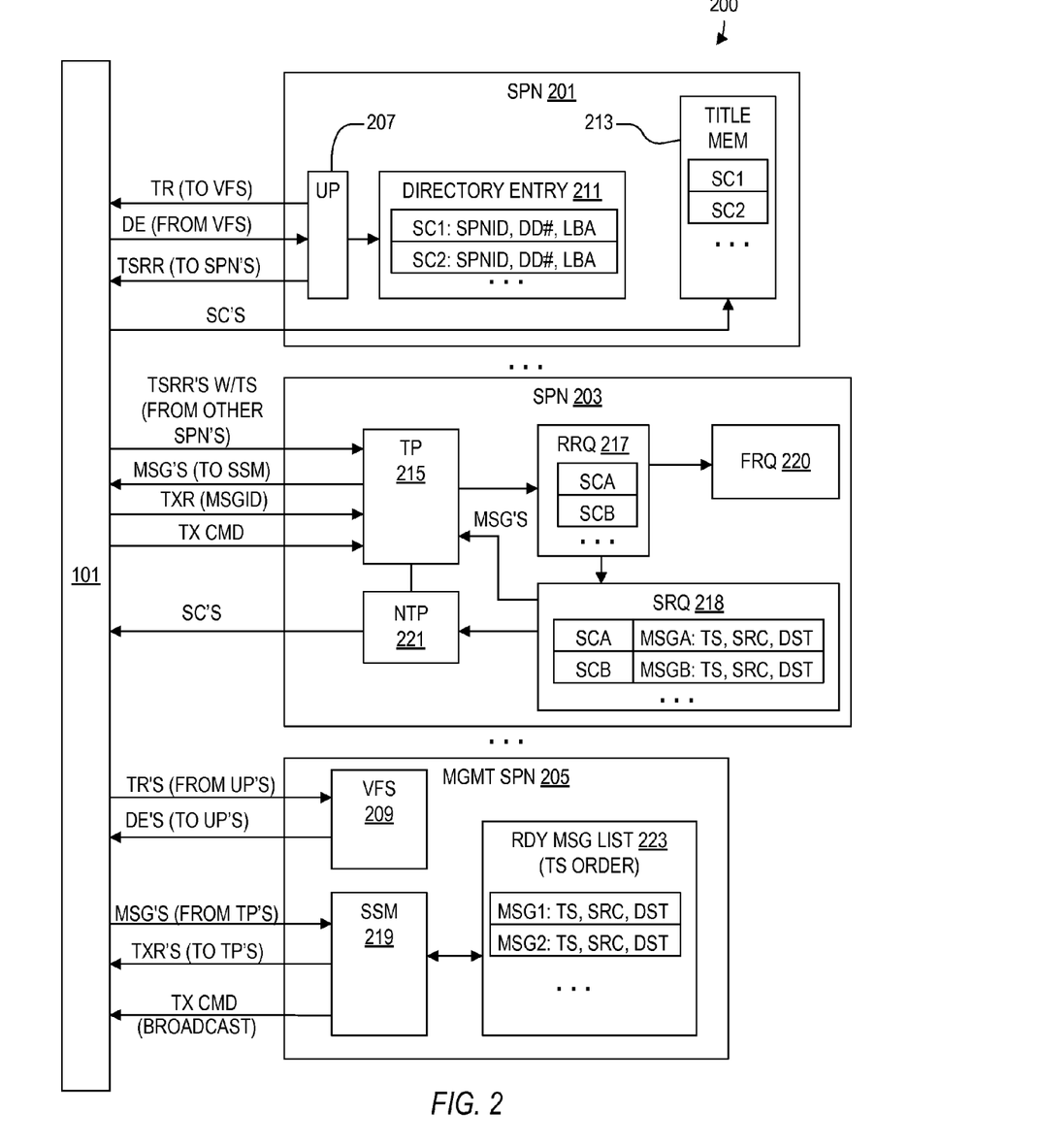
FIG. 2 is a logical block diagram of a portion of the ICE of FIG. 1 illustrating a synchronized data transfer system.

FIG. 2 is a logical block diagram of a portion of the ICE 100 illustrating a synchronized data transfer system 200 implemented according to an embodiment of the present invention. The switch 101 is shown coupled to several exemplary SPNs 103, including a first user SPN 201, a second user SPN 203, and a management (MGMT) SPN 205. As previously noted, many SPNs 103 are coupled to the switch 101 and only two user SPNs 201, 203 are shown for illustrating the present invention and are physically implemented just as any SPN 103 as previously described. The MGMT SPN 205 is physically implemented just like any other SPN 103, but generally performs management functions rather than the specific user functions. The SPN 201 illustrates certain functions and the SPN 203 illustrates other functions of each user SPN 103. It is understood, however, that each user SPN 103 is configured to perform similar functions so that the functions (and processes) described for the SPN 201 are also provided on the SPN 203 and vice-versa.

As previously described, the switch 101 operates at 1 Gbps per port, so that each subchunk (about 512 KB) takes about 4 ms to pass from one SPN to another. Each user SPN 103 executes one or more user processes (UPs), each for supporting a downstream user. When a new chunk of a title is needed to refill a user output buffer (not shown), the next five subchunks from the list are requested from the other user SPNs storing those subchunks. Since many UPs potentially request multiple subchunks substantially at the same time, the subchunk transmission duration would otherwise overwhelm the buffering capacity of almost any GbE switch for a single port, let alone for the whole switch. This is true for the illustrated switch 101. If subchunk transmission is not managed, it would result in potentially all five subchunks for each UP being returned simultaneously, overwhelming the output port bandwidth. It is desired to tighten the timing of the transmissions of SPNs of the ICE 100, so that the most critical data is transmitted first, and intact.

The SPN 201 is shown executing a UP 207 for servicing a corresponding downstream user. The user requests a title (e.g., a movie), which request is forwarded to the UP 207. The UP 207 transmits a title request (TR) to the VFS 209 (described further below) located on the MGMT SPN 205. The VFS 209 returns a directory entry (DE) to the UP 207, which locally stores the DE shown at 211. The DE 211 includes a list locating each subchunk of the title (SC1, SC2, etc.), each entry including the SPNID identifying a specific user SPN 103, the disk drive number (DD#) identifying a specific disk drive 111 of the identified SPN 103, and an address or LBA providing the specific location of the subchunk on the identified disk drive. The SPN 201 initiates a time stamped read request (TSRR) for each subchunk in the DE 211, one at a time. In the ICE 100, the requests are made immediately and directly. In other words, the SPN 201 begins making the requests for the subchunks immediately and directly to the specific user SPNs 103 storing the data. In the configuration shown, the requests are made in the same manner even if locally stored. In other words, even if the requested subchunk resides on a local disk drive of the SPN 201, it sends out the request via the switch 201 as though remotely located. The network is the location that may be configured to recognize that a request is being sent from an SPN to the same SPN. It is simpler to handle all cases the same especially in larger installations in which it is less likely that the request will actually be local.

Although the requests are sent out immediately and directly, the subchunks are each returned in a fully managed manner. Each TSRR is to the specific user SPN using the SPNID, and includes the DD# and LBA for the target user SPN to retrieve and return the data. The TSRR may further include any other identification information sufficient to ensure that the requested subchunk is properly returned to the appropriate requestor and to enable to the requester to identify the subchunk (e.g., UP identifier to distinguish among multiple UP's executing on the destination SPN, a subchunk identifier to distinguish among the subchunks for each data chunk, etc.) Each TSRR also includes a timestamp (TS) identifying the specific time when the original request is made. The TS identifies the priority of the request for purposes of synchronous transmission, where priority is based on time such that earlier requests assume higher priority. When received, the returned subchunks of the requested title are stored in a local title memory 213 for further processing and delivery to the user which requested the title.

The user SPN 203 illustrates operation of a transfer process (TP) 215 and supporting functions executing on each user SPN (e.g., 201, 203) for receiving TSRRs and for returning the requested subchunks. The TP 215 includes or is otherwise interfaced with a storage process (not shown) which interfaces the local disk drives 111 on the SPN 203 for requesting and accessing the stored subchunks. The storage process may be implemented in any desired manner, such as a state machine or the like, and may be a separate process interfaced between the TP 215 and the local disk drives 111 as known to those skilled in the art. As shown, the TP 215 receives one or more TSRRs from one or more UPs executing on the other user SPNs 103 and stores each request in a read request queue (RRQ) 217 in its local memory 109. The RRQ 217 stores a list of requests for subchunks SCA, SCB, etc. The disk drive storing the requested subchunks removes the corresponding requests from the RRQ 217, sorts them in physical order, and then executes each read in the sorted order. Accesses to subchunks on each disk is managed in groups. Each group is sorted in physical order according to "elevator seek" operation (one sweep from low to high, next sweep from high to low, etc., so that the disk head sweeps back and forth across the disk surface pausing to read the next sequential subchunk). Requests for successful reads are stored in a successful read queue (SRQ) 218 sorted in TS order. Requests for failed reads (if any) are stored in a failed read queue (FRQ) 220 and failed information is forwarded to a network management system (not shown) that determines the error and the appropriate corrective action. It is noted that in the configuration illustrated, the queues 217, 218 and 220 store request information rather than the actual subchunks.

Each subchunk that is successfully read is placed in memory reserved for an LRU cache of recently requested subchunks. For each retrieved subchunk, the TP 215 creates a corresponding message (MSG), which includes the TS for the subchunk, the source (SRC) of the subchunk (e.g., the SPNID from which the subchunk is being transmitted and its physical memory location along with any other identifying information), and the destination (DST) SPN to which the subchunk is to be transmitted (e.g., the SPN 201). As shown, the SRQ 218 includes messages MSGA, MSGB, etc., for subchunks SCA, SCB, etc., respectively. After the requested subchunks are read and cached, the TP 215 sends corresponding MSGs to a synchronized switch manager (SSM) 219 executing on the MGMT SPN 205.

The SSM 219 receives and prioritizes multiple MSGs received from TPs from user SPNs and eventually sends a transmit request (TXR) to the TP 215 identifying one of the MSGs in its SRQ 218, such as using a message identifier (MSGID) or the like. When the SSM 219 sends a TXR to the TP 215 with a MSGID identifying a subchunk in the SRQ 218, the request listing is moved from the SRQ 218 to a network transfer process (NTP) 221, which builds the packets used to transfer the subchunk to the destination user SPN (where "moved" denotes removing the request from the SRQ 218). The order in which subchunk request listings are removed from the SRQ 218 is not necessarily sequential, in spite of the list being in timestamp order, as only the SSM 219 determines the proper ordering. The SSM 219 sends one TXR to every other SPN 103 having at least one subchunk to send unless the subchunk is to be sent to a UP on an SPN 103 already scheduled to receive an equal or higher priority subchunk, as further described below. The SSM 219 then broadcasts a single transmit command (TX CMD) to all user SPNs 103. The TP 215 instructs the NTP 221 to transmit the subchunk to the requesting UP of the user SPN 103 in response to the TX CMD command broadcasted by the SSM 219. In this manner, each SPN 103 having received a TXR from the SSM 219 simultaneously transmits to another requesting user SPN 103.

The VFS 209 on the MGMT SPN 205 manages the list of titles and their locations in the ICE 100. In typical computer systems, directories (data information) usually resides on the same disk on which the data resides. In the ICE 100, however, the VFS 209 is centrally located to manage the distributed data since data for each title is distributed across multiple disks in the disk array, which are in turn distributed across multiple user SPNs 103. As previously described, the disk drives 111 on the user SPNs 103 primarily store the subchunks of the titles. The VFS 209 includes identifiers for the location of each subchunk via SPNID, DD#, and the LBA as previously described. The VFS 209 also includes identifiers for other parts of the ICE 100 that are external, such as the optical storage. When a user requests a title, a full set of directory information (ID's/addresses) is made available to the UP executing on the user SPN 103 that accepted the user's request. From there, the task is to transfer subchunks off of disk drives to memory (buffers), moving them via the switch 101 to the requesting user SPN 103, which assembles a full chunk in a buffer, delivers it to the user, and repeats until done.

The SSM 219 creates a list of "ready" messages in timestamp order in a ready message (RDY MSG) list 223. The order in which the messages are received from the TPs on the user SPNs 103 are not necessarily in timestamp order, but are organized in TS order in the RDY MSG list 223. Just before the next set of transfers, the SSM 219 scans the RDY MSG list 223 starting with the earliest time stamp. The SSM 219 first identifies the earliest TS in the RDY MSG list 223 and generates and sends the corresponding TXR message to the TP 215 of the user SPN 103 storing the corresponding subchunk to initiate a pending transfer of that subchunk. The SSM 219 continues scanning the list 223 for each subsequent subchunk in TS order generating the TXR messages for each subchunk whose source and destination are not already involved in a pending subchunk transfer. For each TX CMD broadcast to all of the user SPNs 103, each user SPN 103 only transmits one subchunk at a time and only receives one subchunk at a time, although it can do both simultaneously. For example, if a TXR message is sent to the TP of SPN #10 to schedule a pending subchunk transfer to SPN #2, then SPN #10 cannot simultaneously send another subchunk. SPN #10 can, however, simultaneously receive a subchunk from another SPN. Furthermore, the SPN #2 cannot simultaneously receive another subchunk while receiving the subchunk from SPN #10, although the SPN #2 can simultaneously transmit to another SPN because of the full duplex nature of each of the ports of the switch 101.

The SSM 219 continues scanning the RDY MSG list 223 until all user SPNs 103 have been accounted for, or when the end of the RDY MSG list 223 is reached. Each entry in the RDY MSG list 223 corresponding to a TXR message is eventually removed from the RDY MSG list 223 (either when the TXR message is sent or after the transfer is completed). When the last transfer of the previous period has finished, the SSM 219 broadcasts a TX CMD packet which signals all user SPNs 103 to begin the next round of transmissions. Each transfer occurs synchronously within a period of approximately 4 to 5 ms for the specific configuration illustrated. During each transfer round, additional MSGs are sent to the SSM 219 and new TXR messages are sent out to the user SPNs 103 to schedule the next round of transmissions, and the process is repeated. The period between successive TX CMDs is approximately equal to the period necessary to transmit all of the bytes of a subchunk, including packet overhead and inter-packet delay, plus a period to clear all caching that may have occurred in the switch during the transmission of the subchunk, typically 60 microseconds (μs), plus a period to account for any jitter caused by a delay in recognition of the TX CMD by an individual SPN, typically less than 100 μs.

In one embodiment, a duplicate or mirrored MGMT SPN (not shown) mirrors the primary MGMT SPN 205, so that the SSM 219, the VFS 209, and the dispatcher are each duplicated on a pair of redundant dedicated MGMT SPNs. In one embodiment, the synchronizing TX CMD broadcast acts as a heartbeat indicating the health of the MGMT SPN 205. The heartbeat is a signal to the secondary MGMT SPN that all is well. In the absence of the heartbeat, the secondary MGMT SPN takes over all management functions within a predetermined period of time, such as, for example, within 5 ms.

Figure 3:
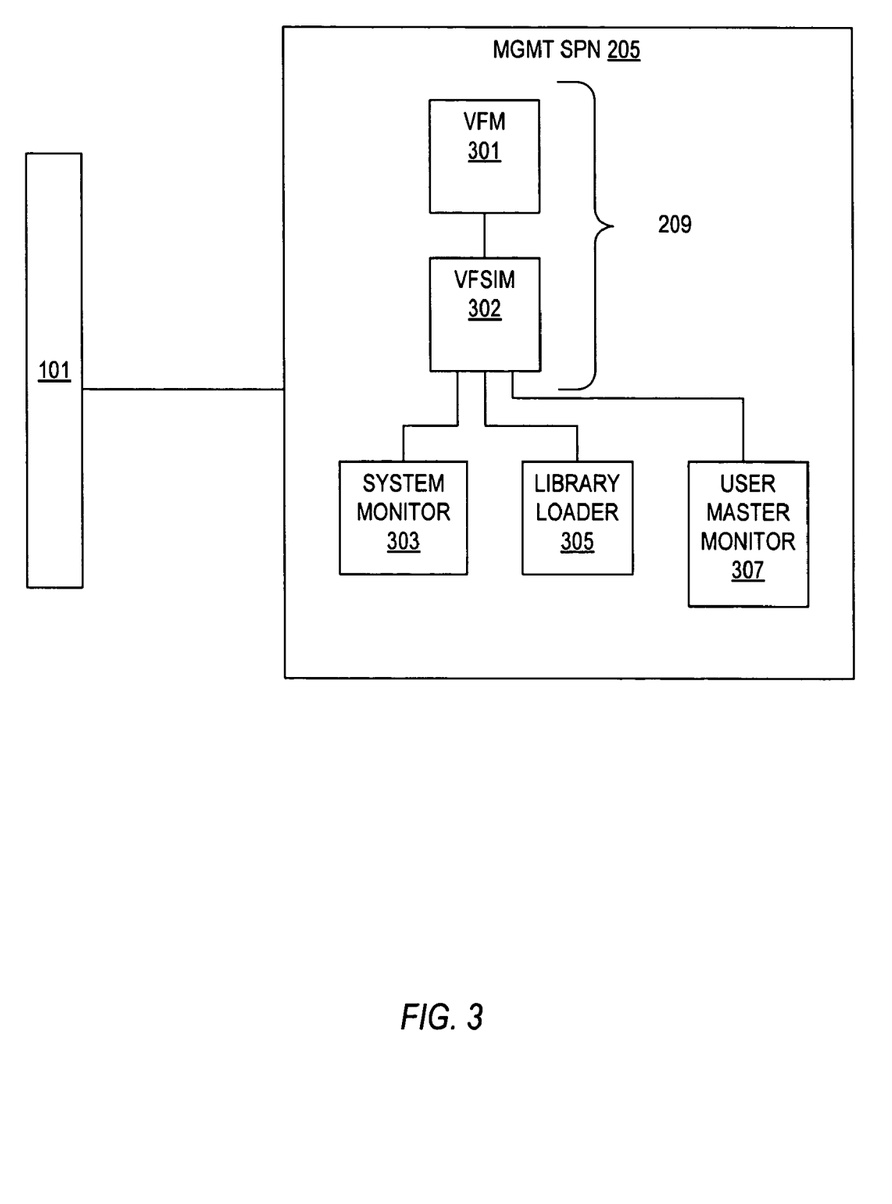
FIG. 3 is a block diagram of a portion of the ICE of FIG. 1 illustrating further details of the VFS of FIG. 2 and supporting functionality according to an embodiment of the present invention.

FIG. 3 is a block diagram of a portion of the ICE 100 illustrating further details of the VFS 209 and supporting functionality according to an embodiment of the present invention. As shown, the VFS 209 includes a virtual file manager (VFM) 301 and a VFS interface manager (VFSIM) 302. The VFSIM 302 is the communications conduit between the VFM 301 and the rest of the ICE 100, including a system monitor (SM) 303, a library loader (LL) 305 and a user master monitor (UMM) 307. The VFSIM 302 receives requests and directives from the SM 303 and provides services to the LL 305 and the UMM 307. Requests and directives intended for the VFM 301 are queued and held until retrieved. Responses from the VFM 301 are buffered and returned to the requestor. The VFSIM 302 manages background tasks initiated by itself and the VFM 301. These tasks include automatic content re-striping, storage device validation/repair, and capacity upsizing and downsizing. The VFSIM 302 monitors hardware addition/removal notifications; remembering device serial numbers so it can automatically initiate validation/repair when necessary. The discussion herein refers to the VFS 209, which may involve either or both the VSM 301 and the VFSIM 302, unless otherwise specified.

The VFS 209 is responsible for managing title content storage (distributed across the storage devices or disk drives) in a way that maximizes overall system performance and facilitates recovery from hardware failures. The VFS 209 is designed to be as flexible as possible to support a wide range of hardware configurations, enabling each site deployment of the ICE 100 to fine-tune hardware expenditures to meet particular usage profiles. A site can increase its capacity by adding new SPNs 103 while the overall system remains operational. Likewise, the VFS 209 also provides the capability to swap SPNs as well as individual storage devices such as serial ATA (SATA) drives in and out of service while remaining operational. The number of SPNs 103 in an ICE 100 is limited only by the bandwidth of the largest contemporary backplane switch implementing the switch 101 (e.g., currently about 500 SPNs). Each SPN 103 can have any number of storage devices (the number of storage devices per SPN is usually constant for a given site), and each storage device can have a different storage capacity (greater than or equal to the minimum designated for that site). Currently, it is typical for a site to have from 1 to 8 hard disk drives per SPN 103, although the design is flexible enough to accommodate new device types as they become available. Furthermore, if an individual physical SPN 103 has twice or three times the minimum capacity for the site, it can be added to the VFS 209 as two or three logical SPNs (this holds true for any even multiple of the minimum capacity). The VFS 209 is designed to allow each site the capability to gradually upgrade its hardware over time, as needs dictate, using the best available hardware at the time of each addition.

The VFS 209 manages content intelligently. It has provisions to smoothly handle peak loads, it can defer tasks that are not time-critical, it automatically redistributes content (re-striping process) to take full advantage of increased site capacity, it prioritizes failure recovery to anticipate demand and rebuild content before it is needed, and it has robust abilities to salvage content from previously used storage devices. In the embodiment shown, the VFM 301 communicates exclusively with the VFSIM 302, which in turn is managed by the SM 303 and provides services to the LL 305 and the UMM 307. At power-up the VFS 209 knows nothing of the system hardware configuration. As each user SPN 103 boots and announces itself, the SM 303 assembles the relevant details for that SPN (its group affiliation, the number of disks, storage capacity of each disk, etc.) and registers it with the VFSIM 302, which notifies the VFM 301. While every SPN is capable of storing content, not all are required to do so. The VFS 209 allows for any number of "hot spares" to be held in reserve with empty disks, ready to assume a role in failure recovery, scheduled maintenance, or other purposes.

At site inception, a decision is made concerning the number of SPNs in a RAID group. Content is spread evenly over each group of SPNs, so SPNs must be added to a site in RAID group increments. The only exceptions are for SPNs designated as spares, which may be added individually in any number, and for redundant management SPNs. Most SPNs 103 are added during system initialization, however new groups of SPNs may be added at any point during the lifetime of the system. When a site increases its capacity by adding new groups of SPNs, existing content is automatically re-striped in the background (re-striping process explained below in more detail) to take full advantage of the added hardware. Downsizing the ICE 100 is accomplished by first re-striping (re-striping process in the background), then removing the de-allocated devices.

In the VFS 209, each SPN 103 is assigned a logical ID that can be completely arbitrary, but for convenience it usually corresponds to the SPN's physical location. Once added, a given SPN exists in the VFS 209 as a logical entity until it is deleted. Any free spare SPN can be substituted for another SPN, and when that happens, the same logical address is assigned. Thus, the physical SPN can be swapped at will (explained below in more detail) providing the capability to perform periodic maintenance without interrupting service. As soon as a complete group of SPNs has been registered with the VFS 209, content can begin to be stored on that group. However, to permit uniform distribution of content over the entire system, all SPN groups intended for content storage should be registered prior to loading the first title.

As previously described, each chunk of title content is stored on a different group, and content is spread across all groups in round-robin fashion. More specifically, each chunk is broken up into subchunks (the number of subchunks is equal to the group size for that site, with one of the subchunks being parity derived from the data subchunks), and each subchunk is stored on a different SPN of a given group. For example, assuming a RAID size of five disk drives, the SPN group size is five (and there are five subchunks per chunk of content). If each SPN contains four drives, there are a total of four RAID groups. The first group consists of drive 1 of each SPN; the second group consists of drive 2 of each SPN, and so on.

Figure 4:
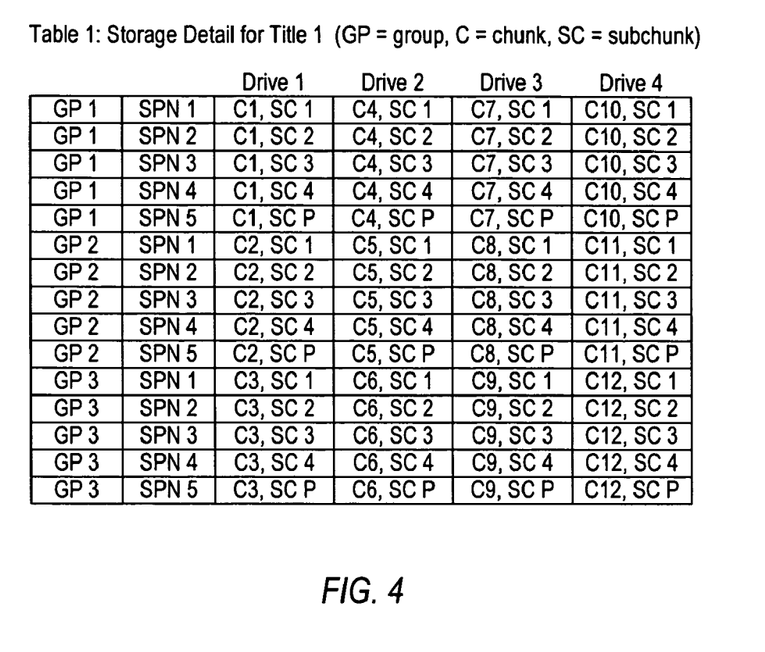
FIG. 4 shows a Table 1 illustrating an exemplary configuration of the ICE of FIG. 1 consisting of only three disk array groups.

Consider an exemplary configuration of the ICE 100 consisting of only three groups GP 1-GP 3 as illustrated by Table 1 shown in FIG. 4 for a first title, Title 1, in which each group is designated GP, each chunk is designated C, and each subchunk of each chunk is designated SC. Table 1 of FIG. 4 shows 3 groups numbered GP 1 through GP 3, twelve chunks numbered C1-C12, and 5 subchunks of each chunk numbered SC 1, SC 2, SC 3, SC 4 and SC P, in which the last "P" subchunk denotes a parity subchunk. The first chunk C1 of title 1 is recorded as five subchunks SC 1-4, SC P (the fifth subchunk is parity), one each on drive 1 of SPNs 1 through 5 of the first group GP 1. The next chunk C2 of title 1 is recorded as five subchunks (again SC 1-4, SC P), one each on drive 1 of SPNs 1 through 5 of the second group GP 2. Likewise, the third chunk C3 is recorded on drive 1 of each SPN 1-5 of the third group GP 3. The fourth chunk C4 is recorded on drive 2 of each SPN 1-5 of the first group GP 1. Table 1 shows how the first title, Title 1, is stored. Losing an entire SPN (one row of Table 1) results in the loss of one drive in each of four RAID groups. All RAID groups continue to produce content, and through parity reconstruction, no content is lost. Additional titles begin on the group and drive following those where the preceding title began. Therefore, the second title, Title 2 (not shown), begins on Drive 2 of GP 2 (the second chunk is on Drive 2 of GP 3, the third chunk is on drive 3 of group 1, and so on). Titles are distributed in this way to minimize start time latency. Each title wraps around the ICE 100 in a spiral that recycles from drive 4 on each SPN of group 3, back to drive 1 of each SPN of group 1.

Figure 5:
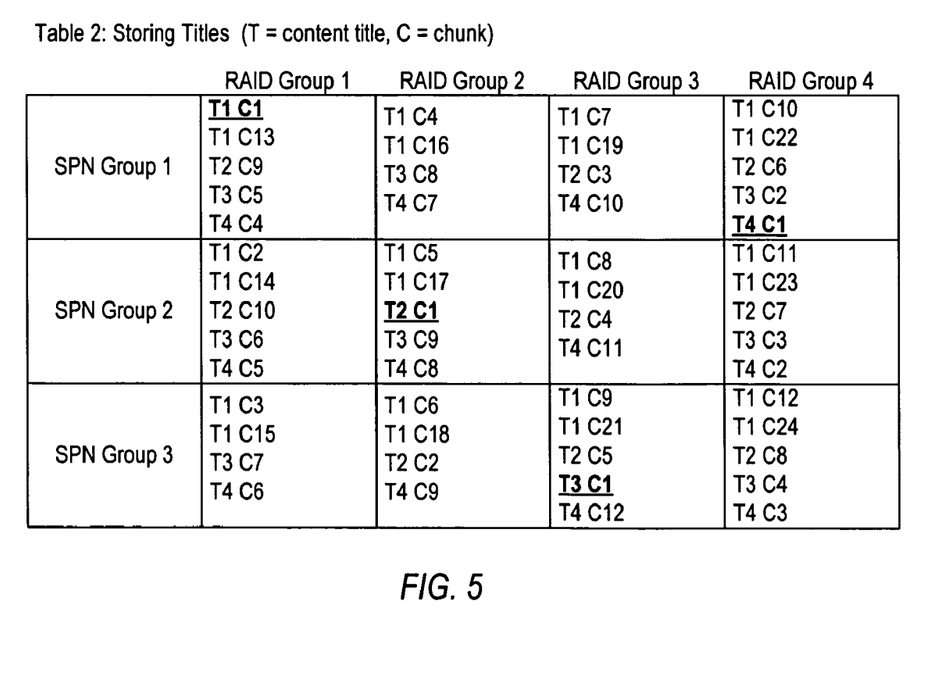
FIG. 5 shows a Table 2 illustrating how four titles are stored using the configuration of Table 1.

Table 2 of FIG. 5 shows how four titles are stored using the configuration of Table 1. For purposes of illustration, the first title T1 consists of 24 chunks T1 C1-T1 C24, the second title T2 has 10 chunks T2 C1-T2 C10, the third title T3 has 9 chunks T3 C1-T3 C9, and the fourth title T4 has 12 chunks T4 C1-T4 C12. For simplification, each of 3 SPN groups (SPN Group 1, SPN Group 2, SPN Group 3) has been collapsed into a single row, and the first chunk of each title is underlined and has been made bold. A typical title at 4 Mbps consists of 1350 chunks, in three VFS directory entries of 450 chunks each, which represents about one-half hour of content. Using 100 gigabyte (GB) disk drives, each RAID group holds more than 200,000 chunks (meaning each drive in the group holds more than 200,000 subchunks). Subchunk allocation on each drive of a RAID group is typically at the identical point (logical block address) on each drive.

Figure 6:
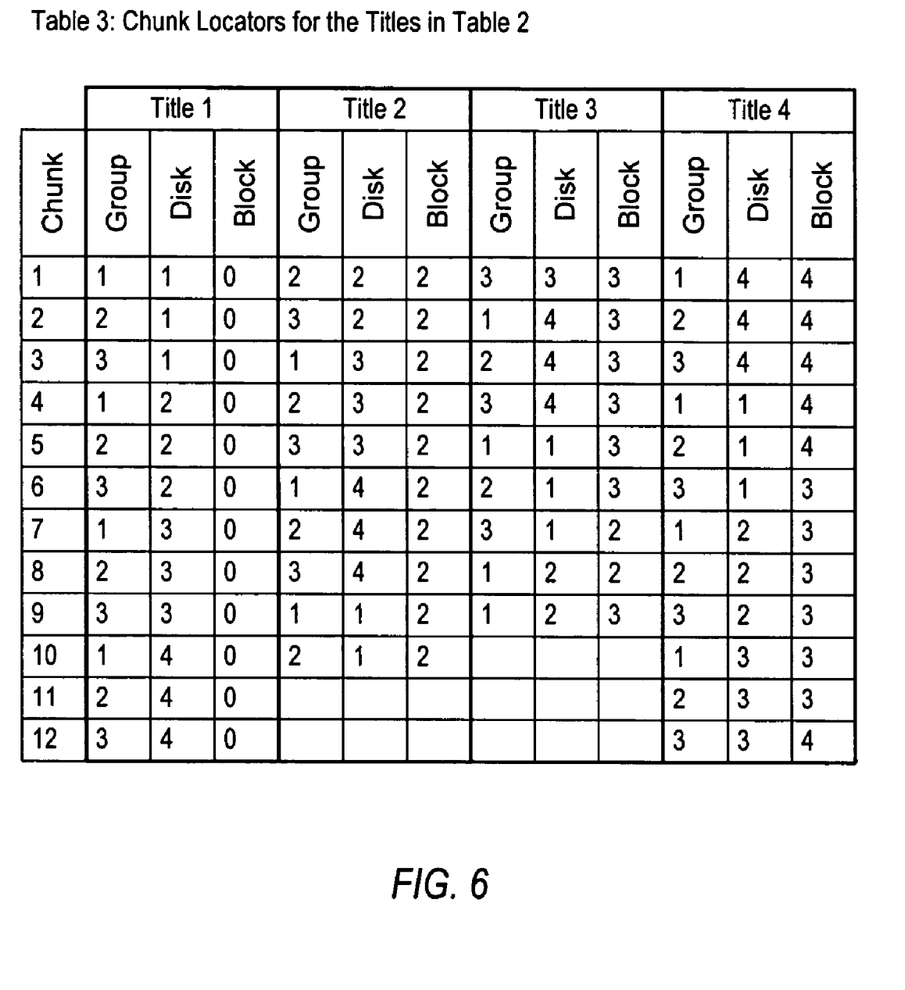
FIG. 6 shows a Table 3 illustrating the contents of the first 12 locators for the 4 titles depicted in Table 2.

In the configuration illustrated, each directory entry (DE) of the VFS 209 consists of various metadata about the title, and an array of chunk locators. The chunk locator data structure consists of 8 bytes: two bytes for identifying the group, two bytes for identifying the disk, and four bytes for identifying the disk allocation block, where each block holds one subchunk. FIG. 6 shows a Table 3 illustrating the contents of the first 12 locators for the 4 titles T1-T4 (shown as Title 1-Title 4) depicted in Table 2. The upper 12 locators not shown for Title 1 use up block 2 on each disk. A lookup table is replicated on the VFSIM 302 and on each SPN 103 that maps the logical address of each disk to the MAC (media access control) ID of the SPN to which it is connected. The LBA corresponding to a subchunk is obtained by simply multiplying the block number times the number of sectors per subchunk. FIG. 7 shows a Table 4 illustrating further details of how subchunks are stored on different RAID groups, SPNs (numbered 1-5), and disk drives (numbered 1-4) for the ICE 100. For example, subchunk Sa of chunk C01 of title T1 is stored in Block 0 of Disk 1 of SPN 1 of RAID Group 1, the next subchunk Sb of chunk C01 of title T1 is stored in Block 0 of Disk 1 of SPN 2 of RAID Group 1, and so on.

The variability in content length results in an unpredictable small variability in the amount of content stored on each SPN 103. For these exemplary titles, the variability is exaggerated, but for hundreds of titles consisting of a thousand or more chunks each, the differences between SPNs are expected to remain less than 1%. Although an individual storage device can have any amount of capacity greater than the site minimum, the amount in excess of the site minimum might not be used to store isochronous content. Therefore, the site minimum should be kept as large as possible, typically, it should be set equal to the capacity of the smallest-capacity storage device at the site. The site minimum can be increased or decreased at any time; for example, it should be increased to a greater value whenever larger devices replace the lowest capacity ones.

Depending on where a given configuration of the ICE 100 is installed and how it is used, the VFS 209 may infrequently receive requests for storage allocation for new titles, or it may receive hundreds of nearly simultaneous requests at the top of each half hour. To rapidly and efficiently meet expected demands for storage, the VFS 209 maintains a pool of pre-allocated directory entries. The pool size is set in advance based on the usage profile of the site, and the pool size can be changed at any time for performance tuning or to respond to site profile changes. When the VFS 209 receives a storage allocation request, it first attempts to fulfill the request from the pool of pre-allocated directory entries. If available, a pre-allocated directory entry is immediately returned to the requestor. If the pool is exhausted, a fresh directory entry is created on-demand as described below. If an allocation request requires multiple directory entries for the same title, only the first entry is immediately returned. Allocation of the remaining entries for that title can take place at a later time, so that task is added to the list of background processes maintained by the VFS 209. Replenishing the pool of pre-allocated entries is also a background task.

To create a directory entry, either pre-allocated or on-demand, the VFS 209 first determines if the required capacity is available (e.g., not currently being used). If so, the request is easily fulfilled. If not, the VFS 209 de-allocates one or more of the least recently used (LRU) titles as necessary to fulfill the request. When a title is de-allocated in this way, the VFS 209 informs the SM 303 and the SPNs 103 of the occurrence. An allocation request is initially fulfilled when the VFS 209 returns the first directory entry to the requester (or caller). When a title has multiple entries, subsequent entries are provided when needed with the caller being able to specify which entry it desires. Similarly, if an existing title is expanded, the first expanded entry is immediately returned and the other entries can be specifically requested when needed. Each entry contains a table of subchunk locators capable of storing up to 30 minutes worth of content. Thus, a 95-minute movie would require 4 entries, with the $4^{th}$ entry being largely unused. More precisely, the $4^{th}$ entry table is largely unused, but there is no wasted space on the actual disk drive since the only disk space consumed is that actually required for the 5 minutes of content. Internally, the VFS 209 keeps track of available subchunk locations on each storage device using memory-efficient data structures.

Reclaiming unused storage space is made possible by incorporating a Last Valid Chunk (LVC) pointer in each entry. In the example above, the $4^{th}$ entry, when given to the requestor, initially has 30 minutes worth of storage reserved. When the component actually storing the content has completed its task, it updates the LVC pointer and informs the VFS 209. The VFS 209 then releases any unused blocks, making them available for use elsewhere. Being variable in length, each title ends wherever it ends, and there is no need to waste disk space for any reason such as aligning storage to some arbitrary boundary. Thus, the VFS 209 packs disks as fully as possible, utilizing whatever is the next free block on the device. Initially, in the interest of simplicity, small files (e.g., system files that may fit entirely within a single block) are managed in the same way as any other content. Eventually, a micro-VFS capability can be added that treats a chunk as though it were a disk drive for the purpose of storing many small files.

The SM 303 may also direct the VFS 209 to de-allocate a title at any time, as when a title's license period expires, or for any other reason. A commanded de-allocation is complicated by the fact that the title may currently be in use, and when this happens, in one embodiment, de-allocation is not completed until every user accessing that title signals termination of all usage of that title. The VFS 209 tracks all entries currently in use by each UMM 307, and also tracks entries in use by background processes. During the latency period, no new users are permitted access to a title flagged for de-allocation.

After the addition or deletion of new SPN groups, existing content is redistributed, or "re-striped" to make resource utilization as uniform as possible during the re-striping process. The VFS 209 does re-striping automatically whenever it is necessary. To keep things simple, the new and old entries do not have any overlap; there are no storage blocks common to both new and old (see below). Once the new re-striped copy is complete (completion time is unpredictable because the rate of progress is limited by available bandwidth), new users can begin accessing it and the old copy can simply be de-allocated using standard procedures. During the re-striping process, most subchunks are copied from their original SPN to a different SPN, while a small percentage is copied to a different location within the same SPN. (The percentage of subchunks remaining on the same SPN is m/(m*n), where "m" is the previous number of SPNs and "n" is the new number of SPNs. For a site upgrading from 100 to 110 SPNs, 100 out of every 11,000 subchunks are copied within the same SPN.

Real-time operations include instances where the content is purely transitory, and instances where it is being saved. If there is ever a need for a transitory real-time buffer, in one embodiment, the ICE 100 uses a single 30-minute directory entry as a circular buffer, and when no longer needed, the entry is de-allocated using standard procedures as for any other title. When the real-time content is being saved, additional 30-minute entries are requested as needed, with the VFS 209 de-allocating LRU titles as necessary. As with any other title, raw content is immediately available for playback up to the point indicated by the LVC pointer, and the LVC pointer is periodically updated while storage continues to take place. In some cases "raw content" may be divided into specific title(s) prior to being made available to subscribers who wish to request it subsequent to its initial airing time. When ready, the edited content is added to the VFS 209 like any other title and the raw content could be deleted.

It may occasionally be desired to take an operational SPN 103 or disk drive off-line for whatever purpose. To accomplish this with no adverse impact, the ICE 100 is configured to copy, or more precisely, "clone" the device using one of the hot spares as the content recipient. When the copying process is complete (again, since it is limited by available bandwidth the time is unpredictable), the clone then assumes the identity of the former device and operations continue smoothly with the VFSIM 302 and the SPNs 103 receiving notification. Unless the device is physically disconnected and reconnected to the ICE 100 (i.e., unless it is unplugged and moved), no participation is required of the VFM 301 since the cloning process and the identity swap are invisible to the VFM 301 (SPNs are logical entities to the VFM 301, not physical ones, because the internet protocol (IP) address is used instead of the MAC ID). When a disk or SPN is connected to the ICE 100, it automatically goes through a validation/repair process (described below) to guarantee data integrity.

From the perspective of any given content stream, the loss of a storage device or the loss of an entire SPN looks the same. In particular, there is one subchunk missing out of every nth chunk (where n is determined by the number of SPNs 103 in the system). The ICE 100 is designed to compensate for this type of loss by parity reconstruction, allowing ample time for hardware replacement. Repair, validation, and cloning are disk-specific processes. To repair, validate, or clone an SPN it is simply a matter of initiating a process for each disk within the SPN. When a UP sends requests for subchunks of a chunk and any one subchunk is not returned within a predetermined period of time, the UP reconstructs the missing subchunk using the retrieved subchunks. In one embodiment, the reconstructed subchunk is sent to the user SPN from which that subchunk should have been sourced regardless of the reason for the failure (i.e., due to failure of the SPN or drive on the SPN or simply due to delay through the network). If the user SPN that should have sourced the missing subchunk is not available to receive the reconstructed subchunk, then it is simply lost during transmission. If the SPN is available to receive the reconstructed subchunk (e.g., the SPN is back online or the failure was limited to a disk drive of that SPN), then it caches the subchunk in memory as though it were read from its local disk drive.

Hot-swapping and parity reconstruction require that each SPN 103 have awareness of whether or not each block on each device is valid. Initially, when an SPN comes on-line it has no valid blocks. When the SPN receives and stores a subchunk (or validates what is already there) it marks that block as valid. When an SPN receives a request for a subchunk stored in a block marked as invalid, the SPN replies with a request to receive that subchunk. If the missing subchunk has been recreated elsewhere in the ICE 100 through parity reconstruction, it is sent back to the SPN (using available bandwidth) for storage and the block is marked as valid. The lack of a request for that subchunk indicates that the SPN is still non-functional and no reconstructed subchunk need be sent. Using this protocol, a replacement device is repopulated with minimal additional overhead. Meanwhile, to catch those chunks not already taken care of because of their high demand, a simple background validation/repair process does the beginning-to-end reconstruction, skipping over blocks already marked valid.

Under certain circumstances, as when the VFSIM 302 recognizes reconnection of a disk formerly known to have valid content, the SPN 193 is directed to override its prohibition against sending subchunks marked as invalid. If the probationary subchunk passes its checksum test, the subchunk can be used (and the source SPN can mark it as valid), thereby avoiding the unnecessary overhead of parity reconstruction. The failure of an SPN to supply a requested subchunk coupled with the failure to request said subchunk indicates SPN failure. By monitoring such failures, the ICE 100 automatically notifies the system operators and initiate recovery procedures during lights-out operations.

The VFSIM 302 automatically initiates and manages disk validation/repair when a different physical disk replaces an existing one containing content. For disk validation/repair, the VFM 301 prepares a Disk Repair Entry (DRE) similar to the directory entries already in use, but with a few small differences. The 450 subchunks are all from the bad drive, and chunks are included from more than one title. The checksum for every subchunk (including the missing one) is also included. The DRE is populated starting with the most recently used title, followed by the next recently used title, and so on. It does not matter if the title does not completely fit because the next DRE picks up where the last one left off. Since the total number of DREs is not known in advance, the DRE simply has a flag telling if it is the last one. This procedure allows the repair to be done in an orderly, prioritized fashion with the greatest possible data integrity.

Repair is desired whenever there has been data loss, such as when a fresh disk replaces a malfunctioning one. When the malfunctioning disk is not available somewhere on the ICE 100, recovery takes place entirely on the SPN 103 hosting the new disk. Using one DRE at a time, the host SPN requests the group-mates of a missing subchunk and uses them for parity reconstruction. The reconstructed subchunk is saved and the block is marked as valid. If, on the other hand, the malfunctioning disk is connected to a spare SPN, the VFSIM 302 recognizes it and attempts to recover any available subchunks in an effort to reduce the amount of parity reconstruction required. The VFSIM 302 sends the DRE first to the spare SPN, where it uses the checksum and locator to test candidate subchunks for validity. When one passes, the spare SPN marks the subchunk as valid and sends it to the SPN needing it, where it is stored as valid. When the spare SPN has recovered and sent all the subchunks it possibly can, it notifies the VFSIM 302 that it has finished with the DRE. If not all subchunks are recovered at this point, the VFSIM 302 sends the DRE to the SPN hosting the new disk, and parity reconstruction is undertaken as necessary.

Content validation is desired whenever a disk or SPN is connected to the system, as when a reconstructed disk is moved from one SPN to another. The validation process is essentially the same as the repair process, only faster. The same DRE is employed with each candidate subchunk being inspected one at a time. A checksum is calculated for the subchunk existing on the disk. If the calculated checksum matches the checksum in the DRE, the subchunk is considered valid. If the checksums do not match, the other four subchunks corresponding to that subchunk are requested from the other SPNs in the RAID group and the missing subchunk is reconstructed and stored. The validation process is faster than the rebuild process simply because most if not all subchunks pass the initial checksum test. Having the validation process be the same as the rebuild process gives the operators the flexibility to move a drive to its correct slot even if the rebuild process is only partially complete. When the operator unplugs a partially rebuilt disk, that rebuild process is aborted, and when the disk is plugged into its new slot, a new validation/rebuild process is initiated.

Cloning is easier than the rebuild/validation process due to the advantage of being able to simply copy data from the host device. The clone host pushes stored content to the recipient, and in addition, the clone host pushes along changes as they occur. This means that after the entire body of content has been transferred to the recipient, the cloning process is allowed to idle along indefinitely, keeping the two devices totally synchronized. When the cloning is complete, the clone device assumes the logical identity of the host device and no further validation is required (unless the device is moved). Aside from the potential role in validation, the VFS 209 is not involved in cloning. Because the host is responsible for pushing and synchronization, there is no need to create (then destroy) duplicate data structures in the VFS 209 for the recipient.

Upon request from the SM 303, the VFS 209 is capable of reporting information useful for management of the ICE 100, including a Most Recently Used (MRU) titles list (not shown) and a device utilization report (not shown) including statistics. The MRU list contains one record for each title currently stored, along with specific information for that title, such as the date it was last requested, the total number of times it has been requested, its total size, and whether of not it can be deleted. The device utilization report contains one record for each SPN, giving its IP address, its group affiliation, and an array having information for each storage device, such as the device's ID, its total number of blocks, and the number of blocks currently allocated. The VFS 209 also participates in system logging, adding an entry for each notable event.

It is now appreciated that a virtual file system according to the present invention provides an organized distribution of title data which maximizes speed of access as well as efficient storage of each title. Each title is subdivided into multiple subchunks which are distributed among the disk drives of a disk drive array coupled to multiple storage processor nodes including a management node. A virtual file manager executing on the management node manages storage and access of each subchunk of each title stored in the array. The virtual file manager maintains a directory entry for each title, where each directory entry is a list of subchunk location entries for the title. Each subchunk location entry includes a storage processor node identifier, a disk drive identifier, and a logical address for locating and accessing each subchunk of each title stored on the disk drive array.

The centralization of file management provides many benefits and advantages over disk and storage systems of prior art. Files or "titles" may be of any size up to full storage capacity of all drives combined and are not limited to a single drive or redundant storage group. The full capacity of each drive is available for storing content as directory information is centrally stored. Each request for a title is not limited to one disk drive or a few disk drives but the load is spread among many up to all of the disk drives in the array. The synchronous switch manager maximizes efficiency by ensuring that each node receives one subchunk of data at a time in sequential transmit periods. The centralized file manager allows realization of full platter to output bandwidth of each disk drive rather than requiring any sort of local directory on any disk drive. In one embodiment, factory configured logical to physical remapping on each disk drive is employed, allowing information to be recovered from each drive with a single seek operation. As appreciated by those skilled in the art, the standard directory seek penalty is extreme, and can reduce drive bandwidth to far less than half of its specification. Instead, each subchunk location entry is sufficient to locate and access a corresponding subchunk for a title thereby minimizing overhead on each storage processor node for retrieving and forwarding subchunks of data. There is no need to interface a complicated operating system or perform an intermediate directory seek or the like. The transfer process of the identified processor node accesses the subchunk by providing the logical address (e.g., logical block address) to the identified disk drive, which immediately returns the subchunk stored at that logical address.

The virtual file system further employs data and/or process redundancy protect against loss of data and enables uninterrupted service during reconstruction. Redundant storage groups span individual storage processor nodes, allowing for the failure of any drive, any drive of each redundant disk group (e.g., RAID array), or any single node removing all of its drives. Each drive is uniquely identified, allowing automatic system configuration on startup and much quicker recovery from partial failure or anticipated failure of a disk. When a drive error occurs, parity reconstruction is performed and reconstructed data is sent to the node where the data should have originated so that it can be cached there. Such structure and process avoids redundant reconstruction of popular titles until the drive and/or node is replaced, which provides a major time saving for the user processes distributed among the nodes. Furthermore, a redundant management node executing a redundant virtual file manager enables uninterrupted operation in the event of any single point of failure in the overall system.

Many other advantages and benefits are achieved. The Interactive Content Engine 100 is not overloaded by hundreds of simultaneous requests for storage allocation. It allows hundreds of thousands of video streams to be recorded and played back simultaneously without overloading the system with directory transactions (<1% of bandwidth for 100,000 streams). It allows management functions, such as preallocating storage, restriping content, deleting titles, and cloning drives and SPNs to occur in the background without interfering with isochronous content playback and ingestion.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A virtual file system, comprising:
a plurality of storage processor nodes, each comprising a processor and a plurality of disk drives coupled to said processor;
a backbone switch, coupled to said plurality of storage processor nodes, that enables communication between each of said plurality of storage processor nodes;
wherein each processor of each of said plurality of storage processor nodes is coupled between said backbone switch and said plurality of disk drives;
wherein said plurality of disk drives of each of said plurality of storage processor nodes collectively comprise a disk drive array which stores a plurality of titles, each title divided into a plurality of subchunks which are distributed across said disk drive array in which each subchunk is stored on a disk drive of said disk drive array; and
at least one management node coupled to said backbone switch, said at least one management node executing a virtual file manager which manages storage and access of each subchunk of said plurality of titles, and which maintains a plurality of directory entries including a directory entry for each title, each said directory entry comprising a list of subchunk location entries in which each subchunk location entry comprises a storage processor node identifier and a disk drive identifier.

2. The virtual file system of claim 1, wherein each of said plurality of subchunks is retrieved in a single seek operation by providing a logical address to an identified disk drive of an identified storage processor node.

3. The virtual file system of claim 1, wherein the full capacity of each disk drive of said disk drive array is available for storage of said plurality of subchunks of said plurality of titles.

4. The virtual file system of claim 1, further comprising:
a user process, executed on a storage processor node, which submits a title request for a selected title to said virtual file manager, which receives a corresponding directory entry for said selected title, and which submits a subchunk read request for each subchunk location entry in said corresponding directory entry;
wherein each subchunk read request is sent to a storage processor node identified by a storage processor node identifier in a corresponding subchunk location entry in said corresponding directory entry, and wherein each subchunk read request includes a destination node identifier, said disk drive identifier and a logical address; and
wherein said virtual file manager retrieves said corresponding directory entry for said selected title and forwards said corresponding directory entry to said user process in response to said title request.

5. The virtual file system of claim 4, further comprising a transfer process, executed on a storage processor node, which receives a subchunk read request, which requests a subchunk using said logical address to locate said requested subchunk from a local disk drive identified by said disk drive identifier, and which forwards a retrieved subchunk to a storage processor node identified by said destination node identifier.

6. The virtual file system of claim 4, wherein each title is subdivided into a plurality of data chunks, each said data chunk comprising a plurality of subchunks collectively comprising redundant data for each data chunk, and wherein said user process is operable to construct any data chunk from one less than all of said plurality of subchunks comprising said any data chunk.

7. The virtual file system of claim 6, wherein said disk drive array is divided into a plurality of redundant array groups, wherein each redundant array group comprises a plurality of disk drives distributed among a plurality of storage processor nodes, and wherein said plurality of subchunks of each data chunk are distributed among disk drives of a corresponding redundant array group.

8. The virtual file system of claim 7, wherein said user process is operable to reconstruct any stored title in the event of any one of: a failure of any one disk drive; a failure of any one disk drive of each of said plurality of redundant array groups; and a failure of any one of said plurality of storage processor nodes.

9. The virtual file system of claim 8, wherein said user process is operable to reconstruct a missing subchunk of a data chunk from remaining subchunks of said data chunk, and is operable to return said reconstructed missing subchunk to a storage processor node that would otherwise have sourced said missing subchunk.

10. The virtual file system of claim 9, wherein in the event that failure of said storage processor node that would otherwise have sourced said missing subchunk is replaced by a replacement storage processor node, said replacement storage processor node re-stores missing and new title data by storing received subchunks including returned and reconstructed subchunks.

11. The virtual file system of claim 9, further comprising a cache memory, coupled to said storage processor node that would otherwise have sourced said missing subchunk, that temporarily stores received subchunks including returned and reconstructed subchunks for transfer to a replacement disk drive of a failed disk drive.

12. The virtual file system of claim 1, wherein each subchunk is stored in a block of a disk drive identified by a logical address, wherein said logical address comprises a logical block address.

13. The virtual file system of claim 1, wherein said virtual file manager manages title storage in which each title is subdivided into a plurality of data chunks, each data chunk comprising a plurality of subchunks incorporating redundant data for each data chunk.

14. The virtual file system of claim 13, wherein said disk drive array is divided into a plurality of redundant array groups, wherein each redundant array group comprises a plurality of disk drives distributed among a plurality of storage processor nodes, and wherein said plurality of subchunks of each data chunk are distributed among disk drives of a corresponding redundant array group.

15. The virtual file system of claim 14, further comprising:
a replacement disk drive with a plurality of missing subchunks coupled to a first storage processor node;
said virtual file manager preparing a disk repair directory entry listing each missing subchunk along with its corresponding parity subchunks comprising a data chunk and forwarding said disk repair directory entry to said first storage processor node; and
a repair process, executed on said first storage processor node, which submits a subchunk read request for each parity subchunk listed in said disk repair directory entry that corresponds to each missing subchunk, which reconstructs each missing subchunk using received corresponding parity subchunks, and which stores reconstructed subchunks onto said replacement disk drive.

16. The virtual file system of claim 15, further comprising:
a spare storage processor node;
a partially failed disk drive, replaced by said replacement disk drive, coupled to said spare storage processor node;
said virtual file manager forwarding said disk repair directory entry first to said spare storage processor node prior to sending to said first storage processor node; and
a salvage process, executed on said spare storage processor node, that employs checksum and locator to test validity of said missing subchunks stored on said partially failed disk drive, and that forwards valid subchunks read from said partially failed disk drive to said first storage processor node for storage on said replacement disk drive.

17. The virtual file system of claim 16, wherein said repair process discards received valid subchunks read from said partially failed disk drive in the event a corresponding missing subchunk has already been reconstructed and stored on said replacement disk drive.

18. The virtual file system of claim 14, wherein said disk drive array comprises a predetermined number of disk drives, and wherein said virtual file manager operates to distribute said plurality of data chunks in an even manner among said plurality of redundant array groups.

19. The virtual file system of claim 18, wherein said virtual file manager performs a re-striping process to re-distribute said plurality of data chunks to maintain even distribution of data in response to a change of said predetermined number of disk drives.

20. The virtual file system of claim 19, wherein said re-striping process is performed as a background task.

21. The virtual file system of claim 19, wherein said virtual file manager performs said re-striping process to redistribute said plurality of data chunks among new disk drives in said disk drive array to maintain even distribution of data upon detecting an increase of said predetermined number of disk drives of said disk drive array.

22. The virtual file system of claim 19, wherein said virtual file manager detects a request to remove specified disk drives of said disk drive array, performs said re-striping process to redistribute said plurality of data chunks to maintain even distribution of data in remaining disk drives, and de-allocates said specified disk drives.

23. The virtual file system of claim 1, wherein said at least one management node comprises a mirror management node which executes a mirror virtual file manager which mirrors operation of said virtual file manager.

24. The virtual file system of claim 1, wherein said virtual file manager maintains a pool of pre-allocated directory entries, each comprising a list of available subchunk location entries.

25. The virtual file system of claim 24, wherein a number of said pool of pre-allocated directory entries is based on performance and site usage profile.

* * * * *